United States Patent
Christophersen et al.

(10) Patent No.: US 10,909,512 B2
(45) Date of Patent: *Feb. 2, 2021

(54) SYSTEM AND METHOD FOR STAGING MONEY TRANSFERS BETWEEN USERS HAVING PROFILES

(71) Applicant: MoneyGram International, Inc., Dallas, TX (US)

(72) Inventors: Thomas Christophersen, West Suffix (GB); Terry Wallace, Tyler, TX (US); Connie Jacobson, Bloomington, MN (US); Renee Rusnak, Frisco, TX (US)

(73) Assignee: MoneyGram International, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/222,520

(22) Filed: Dec. 17, 2018

(65) Prior Publication Data

US 2019/0130370 A1 May 2, 2019

Related U.S. Application Data

(63) Continuation of application No. 13/957,186, filed on Aug. 1, 2013, now Pat. No. 10,192,204.

(51) Int. Cl.
*G06Q 40/00* (2012.01)
*G06Q 20/10* (2012.01)
*G06Q 20/02* (2012.01)

(52) U.S. Cl.
CPC ............. *G06Q 20/10* (2013.01); *G06Q 20/02* (2013.01)

(58) Field of Classification Search
USPC ............... 705/40, 39, 38, 37, 35, 26.4, 27.1; 463/40; 446/268, 431; 700/236, 245;

(Continued)

(56) References Cited

U.S. PATENT DOCUMENTS

| 5,326,960 A | 7/1994 | Tannenbaum |
| 5,432,326 A | 7/1995 | Noblett, Jr. et al. |

(Continued)

FOREIGN PATENT DOCUMENTS

| EP | 1866861 A2 | 12/2007 |
| WO | 9116691 A1 | 10/1991 |

(Continued)

OTHER PUBLICATIONS

A Model for Electronic Money Transfer for Low Resourced Environments: M-Cash; 2008 Third International Conference on Broadband Communications, Information Technology & Biomedical Applications; (pp. 389-393); D.P. Mirembe J. Kizito; D. Tuheirwe; Feb. 12, 2009. (Year: 2009).*

(Continued)

*Primary Examiner* — Tien C Nguyen

(57) ABSTRACT

Various embodiments concern facilitating a money transfer by creating a first profile for a first user and a second profile for a second user. The first user can select the second profile from a plurality of profiles. The first user can enter a value designation for the transfer of money from the first user to the second user. A computing system can then stage the transfer of money based on previously saved profile information for the first user and the second user. The profile information can be used to set a plurality of terms of the money transfer without requiring either of the first user or the second user to reenter this information or otherwise affirmatively set the plurality of terms of the money transfer.

20 Claims, 8 Drawing Sheets

(58) Field of Classification Search
USPC ............ 709/217, 218, 226, 227; 706/25, 45;
318/611; 606/130; 715/708, 704, 753;
235/375, 380, 383; 340/540; 358/1.14;
719/328, 315; 717/108
See application file for complete search history.

(56) References Cited

U.S. PATENT DOCUMENTS

| | | | |
|---|---|---|---|
| 5,434,929 A | | 7/1995 | Beernink et al. |
| 5,604,802 A | | 2/1997 | Holloway |
| 5,864,483 A | | 1/1999 | Brichta |
| 5,920,848 A | | 7/1999 | Schutzer et al. |
| 5,949,044 A | * | 9/1999 | Walker .................. G06Q 20/10 235/379 |
| 5,974,146 A | | 10/1999 | Randle et al. |
| 6,010,067 A | | 1/2000 | Elbaum |
| 6,018,718 A | | 1/2000 | Walker et al. |
| 6,039,250 A | * | 3/2000 | Ito .......................... G06Q 20/02 235/380 |
| 6,073,090 A | | 6/2000 | Fortune et al. |
| 6,139,177 A | | 10/2000 | Venkatraman et al. |
| 6,205,433 B1 | * | 3/2001 | Boesch ................. G06Q 20/02 705/27.1 |
| 6,292,786 B1 | * | 9/2001 | Deaton ............... G06Q 20/0457 705/14.25 |
| 6,370,514 B1 | | 4/2002 | Messner |
| 6,554,184 B1 | * | 4/2003 | Amos ................... G06Q 20/108 235/379 |
| 6,661,466 B1 | | 12/2003 | Kou |
| 6,687,679 B1 | | 2/2004 | Van Luchene et al. |
| 6,915,271 B1 | | 7/2005 | Meyer et al. |
| 6,938,013 B1 | | 8/2005 | Gutierrez-Sheris |
| 6,999,943 B1 | | 2/2006 | Johnson et al. |
| 7,050,983 B2 | | 5/2006 | Kawai |
| 7,083,087 B1 | * | 8/2006 | Gangi ................. G06Q 20/4014 235/380 |
| 7,213,744 B2 | | 5/2007 | Michelsen et al. |
| 7,258,268 B2 | | 8/2007 | Steiger, Jr. |
| 7,356,505 B2 | | 4/2008 | March |
| 7,386,518 B2 | * | 6/2008 | Cordery ................. G06Q 20/02 705/66 |
| 7,389,256 B1 | * | 6/2008 | Adams ................... G06Q 20/02 705/35 |
| 7,392,940 B2 | | 7/2008 | Hansen et al. |
| 7,406,445 B1 | | 7/2008 | Silverbrook et al. |
| 7,490,062 B2 | | 2/2009 | Hansmann et al. |
| 7,568,615 B2 | * | 8/2009 | Corona ................. G06Q 20/10 235/379 |
| 7,647,244 B2 | | 1/2010 | Platner et al. |
| 7,660,734 B1 | | 2/2010 | Neal et al. |
| 7,668,612 B1 | | 2/2010 | Okkonen |
| 7,693,789 B2 | | 4/2010 | Degen et al. |
| 7,742,942 B2 | | 6/2010 | Nicholson |
| 7,761,344 B2 | | 7/2010 | Smith |
| 7,761,367 B1 | | 7/2010 | Scalora et al. |
| 7,797,192 B2 | | 9/2010 | Mitchell et al. |
| 7,810,067 B2 | | 10/2010 | Kaelicke et al. |
| 7,810,721 B2 | | 10/2010 | Powell et al. |
| 7,925,513 B2 | * | 4/2011 | Chao ................. G06Q 30/0613 705/7.11 |
| 8,019,679 B2 | | 9/2011 | Bennett et al. |
| 8,065,213 B2 | | 11/2011 | Rosenfield et al. |
| 8,082,210 B2 | | 12/2011 | Hansen et al. |
| 8,090,594 B2 | | 1/2012 | Grant et al. |
| 8,108,977 B1 | | 2/2012 | Miller |
| 8,463,702 B2 | | 6/2013 | Bennett et al. |
| 8,566,237 B2 | * | 10/2013 | Forzley ................. G06Q 20/102 705/40 |
| 8,571,980 B1 | | 10/2013 | Greenwood |
| 8,589,918 B1 | | 11/2013 | Sapuntzakis et al. |
| 8,646,685 B2 | * | 2/2014 | Bishop ................. G06Q 30/06 235/379 |
| 8,657,688 B1 | * | 2/2014 | Zouiten ................. A63F 13/335 463/42 |
| 8,688,570 B2 | | 4/2014 | Jones et al. |
| 8,738,520 B2 | | 5/2014 | Runkle et al. |
| 8,788,278 B2 | | 7/2014 | Scribner et al. |
| 8,851,366 B2 | | 10/2014 | Modi |
| 9,076,134 B2 | | 7/2015 | Grovit et al. |
| 9,090,594 B2 | | 7/2015 | Ge |
| 9,092,763 B2 | | 7/2015 | Meszaros et al. |
| 9,751,006 B2 | | 9/2017 | Zouiten et al. |
| 9,943,761 B2 | | 4/2018 | Zouiten et al. |
| 10,192,204 B2 | | 1/2019 | Christophersen et al. |
| 10,232,268 B2 | | 3/2019 | Zouiten et al. |
| 10,402,795 B2 | | 9/2019 | Nardone et al. |
| 10,755,245 B2 | * | 8/2020 | Runkle ................. G06Q 20/10 |
| 2001/0014868 A1 | | 8/2001 | Herz et al. |
| 2001/0029467 A1 | | 10/2001 | Yagihashi et al. |
| 2001/0039535 A1 | * | 11/2001 | Tsiounis ............. G06Q 20/4012 705/71 |
| 2002/0002505 A1 | | 1/2002 | Kojima |
| 2002/0052778 A1 | | 5/2002 | Murphy et al. |
| 2002/0055907 A1 | | 5/2002 | Pater et al. |
| 2002/0062249 A1 | | 5/2002 | Iannacci |
| 2002/0091603 A1 | | 7/2002 | Steiger et al. |
| 2002/0111908 A1 | | 8/2002 | Milberger et al. |
| 2002/0143566 A1 | * | 10/2002 | Diveley ................. G06Q 20/108 705/74 |
| 2002/0152177 A1 | | 10/2002 | Wolf |
| 2002/0179401 A1 | | 12/2002 | Knox et al. |
| 2003/0074310 A1 | | 4/2003 | Grovit et al. |
| 2003/0080185 A1 | | 5/2003 | Werther |
| 2003/0083891 A1 | | 5/2003 | Lang et al. |
| 2003/0110072 A1 | | 6/2003 | Delurgio et al. |
| 2003/0120590 A1 | | 6/2003 | Ieshima et al. |
| 2003/0130883 A1 | | 7/2003 | Schroeder et al. |
| 2003/0130948 A1 | * | 7/2003 | Algiene ................. G06Q 20/04 705/44 |
| 2003/0158818 A1 | | 8/2003 | George et al. |
| 2003/0182228 A1 | | 9/2003 | Wolf |
| 2003/0208384 A1 | | 11/2003 | Nelson et al. |
| 2003/0208440 A1 | | 11/2003 | Harada et al. |
| 2003/0220830 A1 | | 11/2003 | Myr |
| 2004/0030647 A1 | | 2/2004 | Hansen et al. |
| 2004/0107146 A1 | * | 6/2004 | Alfano ................. G06Q 20/04 705/26.35 |
| 2004/0143496 A1 | | 7/2004 | Saenz |
| 2004/0167815 A1 | | 8/2004 | DeLaHunt |
| 2004/0172358 A1 | | 9/2004 | Lent et al. |
| 2004/0199462 A1 | | 10/2004 | Starrs |
| 2004/0205023 A1 | | 10/2004 | Hafer et al. |
| 2004/0230527 A1 | | 11/2004 | Hansen et al. |
| 2004/0241627 A1 | | 12/2004 | Delfing |
| 2005/0091155 A1 | | 4/2005 | Pokta |
| 2005/0131816 A1 | | 6/2005 | Britto et al. |
| 2005/0177496 A1 | | 8/2005 | Blagg et al. |
| 2005/0209961 A1 | | 9/2005 | Michelsen et al. |
| 2005/0246268 A1 | | 11/2005 | Foran et al. |
| 2005/0262192 A1 | | 11/2005 | Mamou et al. |
| 2006/0047672 A1 | | 3/2006 | Habon et al. |
| 2006/0074627 A1 | | 4/2006 | Moore et al. |
| 2006/0136907 A1 | | 6/2006 | Bennett et al. |
| 2006/0173985 A1 | | 8/2006 | Moore |
| 2006/0191994 A1 | | 8/2006 | Steiger |
| 2006/0242154 A1 | | 10/2006 | Rawat et al. |
| 2006/0253321 A1 | | 11/2006 | Heywood |
| 2006/0261150 A1 | | 11/2006 | Seifert et al. |
| 2006/0287953 A1 | | 12/2006 | Chauhan |
| 2007/0033112 A1 | | 2/2007 | Nagle, Jr. |
| 2007/0073617 A1 | | 3/2007 | Tolbert et al. |
| 2007/0083479 A1 | | 4/2007 | Swartz et al. |
| 2007/0088010 A1 | * | 4/2007 | Huebler ............ A61K 2300/00 514/170 |
| 2007/0088610 A1 | | 4/2007 | Chen |
| 2007/0108271 A1 | | 5/2007 | Degen et al. |
| 2007/0121843 A1 | | 5/2007 | Atazky et al. |
| 2007/0203821 A1 | | 8/2007 | DuFour |
| 2007/0221728 A1 | | 9/2007 | Ferro et al. |
| 2007/0233615 A1 | | 10/2007 | Tumminaro |
| 2007/0255662 A1 | | 11/2007 | Tumminaro |
| 2007/0294116 A1 | | 12/2007 | Stephens et al. |
| 2008/0033870 A9 | | 2/2008 | Gutierrez-Sheris |

(56) References Cited

U.S. PATENT DOCUMENTS

| | | |
|---|---|---|
| 2008/0046381 A1 | 2/2008 | Naccache |
| 2008/0083826 A1 | 4/2008 | Henry et al. |
| 2008/0109279 A1 | 5/2008 | Csoka |
| 2008/0140568 A1* | 6/2008 | Henry .................. G06Q 20/042 705/40 |
| 2008/0147506 A1 | 6/2008 | Ling |
| 2008/0154719 A1 | 6/2008 | Gounares et al. |
| 2008/0182228 A1 | 7/2008 | Hafez et al. |
| 2008/0249908 A1 | 10/2008 | Lorberg et al. |
| 2008/0275771 A1 | 11/2008 | Levine |
| 2008/0301040 A1 | 12/2008 | Knudson et al. |
| 2009/0006205 A1 | 1/2009 | Bixler et al. |
| 2009/0006233 A1 | 1/2009 | Chemtob |
| 2009/0006549 A1 | 1/2009 | Singh et al. |
| 2009/0037311 A1 | 2/2009 | Omar |
| 2009/0048980 A1 | 2/2009 | Hubsher |
| 2009/0063261 A1 | 3/2009 | Scribner et al. |
| 2009/0063331 A1 | 3/2009 | Rodin |
| 2009/0067331 A1 | 3/2009 | Watsen et al. |
| 2009/0089172 A1 | 4/2009 | Quinlan et al. |
| 2009/0089869 A1 | 4/2009 | Varghese |
| 2009/0100168 A1 | 4/2009 | Harris |
| 2009/0106149 A1* | 4/2009 | Bennett ................ G06Q 20/108 705/42 |
| 2009/0157520 A1 | 6/2009 | Algiene et al. |
| 2010/0100426 A1 | 4/2010 | Sander et al. |
| 2010/0100477 A1 | 4/2010 | Giammanco |
| 2010/0114774 A1 | 5/2010 | Linaman et al. |
| 2010/0153225 A1 | 6/2010 | Ferro et al. |
| 2010/0161485 A1 | 6/2010 | Bulawa et al. |
| 2010/0235283 A1 | 9/2010 | Gerson |
| 2010/0293113 A1 | 11/2010 | Munzer et al. |
| 2010/0299761 A1 | 11/2010 | Shapiro |
| 2011/0059784 A1 | 3/2011 | Lutnick et al. |
| 2011/0137796 A1 | 6/2011 | Tullis |
| 2011/0213653 A1 | 9/2011 | Mesaros |
| 2011/0246328 A1 | 10/2011 | Dunwoody et al. |
| 2011/0282790 A1 | 11/2011 | Bennett et al. |
| 2011/0313920 A1 | 12/2011 | Trickel |
| 2012/0010993 A1 | 1/2012 | Ferrara et al. |
| 2012/0016795 A1 | 1/2012 | Hill et al. |
| 2012/0023008 A1 | 1/2012 | Owen et al. |
| 2012/0030098 A1* | 2/2012 | Bulawa .................. G06Q 20/38 705/40 |
| 2012/0030100 A1 | 2/2012 | Bulawa et al. |
| 2012/0036071 A1 | 2/2012 | Fulton et al. |
| 2012/0209769 A1 | 8/2012 | Rolfs et al. |
| 2012/0245987 A1 | 9/2012 | Isaacson et al. |
| 2012/0303524 A1 | 11/2012 | Bertram et al. |
| 2013/0060690 A1 | 3/2013 | Oskolkov et al. |
| 2013/0073457 A1 | 3/2013 | Sander et al. |
| 2013/0132067 A1 | 5/2013 | Gelbman |
| 2013/0151418 A1 | 6/2013 | Licciardello et al. |
| 2013/0179334 A1 | 7/2013 | Nardone et al. |
| 2013/0191194 A1 | 7/2013 | Shreibati et al. |
| 2013/0282561 A1 | 10/2013 | Runkle et al. |
| 2013/0325720 A1 | 12/2013 | Bennett et al. |
| 2014/0095384 A1 | 4/2014 | Basha |
| 2014/0207664 A1 | 7/2014 | Sander et al. |
| 2014/0213345 A1 | 7/2014 | Zouiten et al. |
| 2014/0244414 A1 | 8/2014 | Runkle et al. |
| 2014/0250014 A1 | 9/2014 | Runkle et al. |
| 2014/0278900 A1 | 9/2014 | Scribner et al. |
| 2014/0279228 A1 | 9/2014 | Fry et al. |
| 2015/0039499 A1 | 2/2015 | Christophersen et al. |
| 2015/0149355 A1* | 5/2015 | Arnthong ............. G06Q 20/387 705/44 |
| 2016/0047440 A1 | 2/2016 | Long et al. |
| 2017/0361231 A1 | 12/2017 | Zouiten et al. |
| 2019/0156307 A1 | 5/2019 | Sander et al. |
| 2019/0388788 A1 | 12/2019 | Zouiten et al. |
| 2020/0160293 A1 | 5/2020 | Nardone et al. |

FOREIGN PATENT DOCUMENTS

| | | |
|---|---|---|
| WO | 0146778 A2 | 6/2001 |
| WO | 2006/093598 A2 | 9/2006 |
| WO | 2009052365 A1 | 4/2009 |

OTHER PUBLICATIONS m-Payment systems: Technologies and business models; 2014 Euro Med Telco Conference (EMTC) (pp. 1-6); Alessandro Vizzarri, Francesco Vatalaro, Jan. 23, 2015. (Year: 2015).*

*Bascom Global Internet Services, Inc. v. AT&T Mobility LLC*, No. 15-1763 (Fed. Cir. Jun. 27. 2016), 26 pages.

Co-pending U.S. Appl. No. 11/846,323, filed Aug. 28, 2007, entitled "Consumer Database Loyalty Program for a Money Transfer System".

Co-pending U.S. Appl. No. 11/874,694, filed Oct. 18, 2007, entitled "Global Compliance Processing System for a Money Transfer System".

Commission Based on Net Profit, Jun. 13, 2006, Intuit Community.

Elham Ramezani, Mobile Payment, Jun. 2008, E-Business Technology, web, 1-18 (Year 2008).

European Patent Office, "Notice from the European Patent Office dated Oct. 1, 2007 concerning business methods" Official Journal of the European Patent Office, vol. 30, No. 11, Nov. 1, 2007, pp. 592-593.

http://files.consumerfinance.gov/f/201210_cfpb_small_business_guide.pdf.

International Preliminary Report on Patentability received for PCT Patent Application No. PCT/US2008/080292, dated Apr. 20, 2010, 5 pages.

International Preliminary Report on Patentability received for PCT Patent Application No. PCT/US2012/022491, dated Aug. 29, 2013, 8 pages.

International Preliminary Report on Patentability received for PCT Patent Application No. PCT/US2012/038607, dated Dec. 5, 2013, 16 pages.

International Preliminary Report on Patentability received for PCT Patent Application No. PCT/US2013/037595, dated Nov. 6, 2014, 10 pages.

Office Action received for European Patent Application No. 08840274.8, dated May 7, 2015, 6 pages.

Office Action received for European Patent Application No. 12704470.9, dated Oct. 14, 2014, 8 pages.

"Money Transmitter Services", snapshot taken Oct. 2011, http://web.archive.org/web/20111 0121 00544/http://www.dfs.ny.gov/consumer/usingamoneytrans.htm, 2 pages.

"Authoring Techniques for Device Independence W3C Woking Group Note", Feb. 18, 2004, 57 pages.

Banorte Selects Moneygram for US Transfers—Mexico, Apr. 17, 2002, Business News Americas—Latin America's Business Information Leader, 1 page.

Dr. Manuel Orozco. "The Remittance Marketplace: Prices, Policy and Financial Institutions." Pew Hispanic Center, Jun. 2004, 45 pages.

Information on MoneyGram.com 2003-2006, archived web pages printed from www.archive.org, Sep. 7, 2010.

International Search Report and Written Opinion issued in PCT/US2008/080292, dated Jan. 20, 2009 , 14 pages.

International Search Report and Written Opinion issued in PCT/US2012/022491, dated Jul. 5, 2012, 10 pages.

International Search Report and Written Opinion issued in PCT/US2012/038607, dated Nov. 13, 2012, 20 pages.

International Search Report and Written Opinion issued in PCT/US2013/037595, dated Jul. 30, 2013, 11 pages.

*Listingbook, LLC v. Market Leader, Inc.*, F.Supp.3d (2015), Westlaw 2015 WL 7176455, 12 pages.

MoneyGram Adds 1,500 Bancomer Locations in Mexico, Apr. 17, 2001, 2 pages.

MoneyGram Corporate—How to transfer money, MoneyGram. International, webpages from http://www.moneygram.com/MGICorp/ConsumerProducts . . . , 5 Pages; May 30, 2007.

(56) References Cited

OTHER PUBLICATIONS

Press release from Norkom Technologies, "Wall Street's Back Office Launches Market-Leading AML software from Norkom," Feb. 15, 2007, 2 pp., http://www.norkom.com.

* cited by examiner

Profile Setup

Profile Information

- User Name
- Password
- Address
- Phone Number
- Profile Picture
- Email Address

⎫ 31

Transfer Terms — Default

| Field | Default |
|---|---|
| Preferred Currency | ☐ |
| Preferred Money Send Mode - 1 | ☐ |
| Preferred Money Send Mode - 2 | ☐ |
| Preferred Money Receive Mode - 1 | ☐ |
| Preferred Money Receive Mode - 2 | ☐ |
| Preferred Agent Location - 1 | ☐ |
| Preferred Agent Location - 2 | ☐ |
| Bank Account Number - 1 | ☐ |
| Bank Account Number - 2 | ☐ |
| Credit Card Number - 1 | ☐ |
| Credit Card Number - 2 | ☐ |

Search Profiles

Rick | 41

Search term

Search Results | 42
- Rick Adams
- Rick Bedford
- Rick Chambers
- Rick Daniels
- Rick Receiver
- Rick Severson

SYSTEM AND METHOD FOR STAGING MONEY TRANSFERS BETWEEN USERS HAVING PROFILES

CROSS-REFERENCE TO RELATED APPLICATION

This application is a continuation of U.S. patent application Ser. No. 13/957,186, filed Aug. 1, 2013, which is incorporated herein by reference in its entirety for all purposes.

TECHNICAL FIELD

The present invention relates to computer systems for money transfers. More particularly, the present invention is a computer system that facilitates money transfers between users having user profiles.

BACKGROUND

A number of businesses offer money transfer and other services through a network of agents. A customer (i.e. a sender) that desires to use these services to transfer money to a third party (i.e. a receiver) can take the money to an agent of the money transfer service. The agent accepts the money, obtains necessary information such as the customer's identity and the identity of the receiver, and initiates a transfer. The money is then made available to the receiver by another agent. The receiver can then pick up the money. In these and other conventional transfers, the sender sets all terms of the transfer when interacting with the agent. The receiver is often notified of the transfer only after the sender has staged the transfer. Therefore, it is up to the sender and receiver to agree upon convenient terms for the transfer before it is staged, and it may further be the responsibility of the sender to convey accurate instructions to the receiver on how to pick-up or otherwise receive the transferred money.

Conventional money transfers, as described above, are typically discrete transfers involving only an ephemeral relationship (from the perspective of the transfer service) between the sender and the receiver. While the personal relationship between the sender and the receiver may be long lasting, the sender's and receiver's interaction with the money transfer provider lasts only as long as needed to carry out the transfer. This can lead to several issues. The sender and receiver have to negotiate the transfer apart from the agent that facilitates the money transfer. This may only require the sender communicating a unique reference number to the receiver that allows the receiver to pick-up the wired money at an agent location, but even miscommunication of the reference number or the incorrect spelling of a name can prevent completion of the money transfer. The sender may be unsure of whether the receiver is in a position to receive the transfer according to the terms set by the sender. Likewise, the receiver may be unsure of whether the sender is mindful of initiating the transfer properly. The receiver may have to inquire with the sender, remind the sender, and/or teach the sender how to initiate the transfer, which can be socially uncomfortable for both the receiver and the sender. Finally, the sender must specify all terms of the transfer with an agent, even though the sender may be unaware of the receiver's preferences for the manner of transfer of the money (e.g., type of currency, will call pick-up or direct deposit). In many transfers, the sender merely wants the receiver to be satisfied at the end of the process, which can be paradoxical considering the sender typically sets all terms of the transfer.

SUMMARY

Various embodiments concern facilitating a money transfer by creating a first profile for a first user and a second profile for a second user. The first user can select the second profile from a plurality of profiles. The first user can enter a value designation for the transfer of money from the first user to the second user. A computing system can then stage the transfer of money based on previously saved profile information for the first user and the second user. The profile information can be used to set a plurality of terms of the money transfer without requiring either of the first user or the second user to reenter this information or otherwise affirmatively set the plurality of terms of the money transfer. Such embodiments can be carried about by a computing system.

Various embodiments concern creating a first profile for a first user, the first profile created by a server based on a first set of profile information for the first user, the first set of profile information stored on the server in association with the first profile. Such embodiments further include creating a second profile for a second user, the second profile created by the server based on a second set of profile information for the second user, the second set of profile information stored on the server in association with the second profile, the second set of profile information including one or more money transfer preferences. Such embodiments further include receiving a first selection at the server from the first user, the first selection comprising selection of the second profile. Such embodiments further include receiving a first value designation from the first user at the server, the first value designation comprising a first amount of money for transfer from the first user to the second user. Such embodiments further include staging a first transfer of the first amount of money from the first user to the second user, the first transfer staged by the server based on the first set of profile information and the second set of profile information.

Various embodiments concern a system for facilitating a money transfer between a first user using a first computing device and a second user using a second computing device, the system comprising a server configured to communicate with the first computer and the second computer. Is some such embodiments, the server is configured to create a first profile for the first user based on a first set of profile information received from the first computing device, the first set of profile information stored on the server in association with the first profile. The server is further configured to create a second profile for the second user based on a second set of profile information received from the second computing device, the second set of profile information stored on the server in association with the second profile, the second set of profile information including one or more money transfer preferences. The server is further configured to receive a first selection from the first computing device, the first selection comprising selection of the second profile from amongst a plurality of profiles. The server is further configured to receive a first value designation from the first computing device, the first value designation comprising a first amount of money for transfer from the first user to the second user. The server is further configured to stage a first transfer of the first amount of money from the first user to the second user, the first transfer staged based on the first set of profile information and the second set of profile information.

Various embodiments concern a system for facilitating a money transfer between a first user using a first computing device and a second user using a second computing device, the system comprising a server configured to communicate with the first computing device and the second computing device. The server is further configured to receive a request from the first computing device to stage a money transfer from the first user to a second user. One or more first money transfer preferences that the first user has previously indicated are stored on the server in association with a first profile for the first user and one or more second money transfer preferences that the second user has previously indicated are stored on the server in association with a second profile for the second user. The first profile is associated with the second profile. The server is further configured to set a plurality of terms of the money transfer based on the one or more first money transfer preferences and the one or more second money transfer preferences and stage the transfer of money from the first user to the second user based on the plurality of terms.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 2 is a view of a profile setup page.

FIG. 3 is a view of a profile search page.

Figure 1:
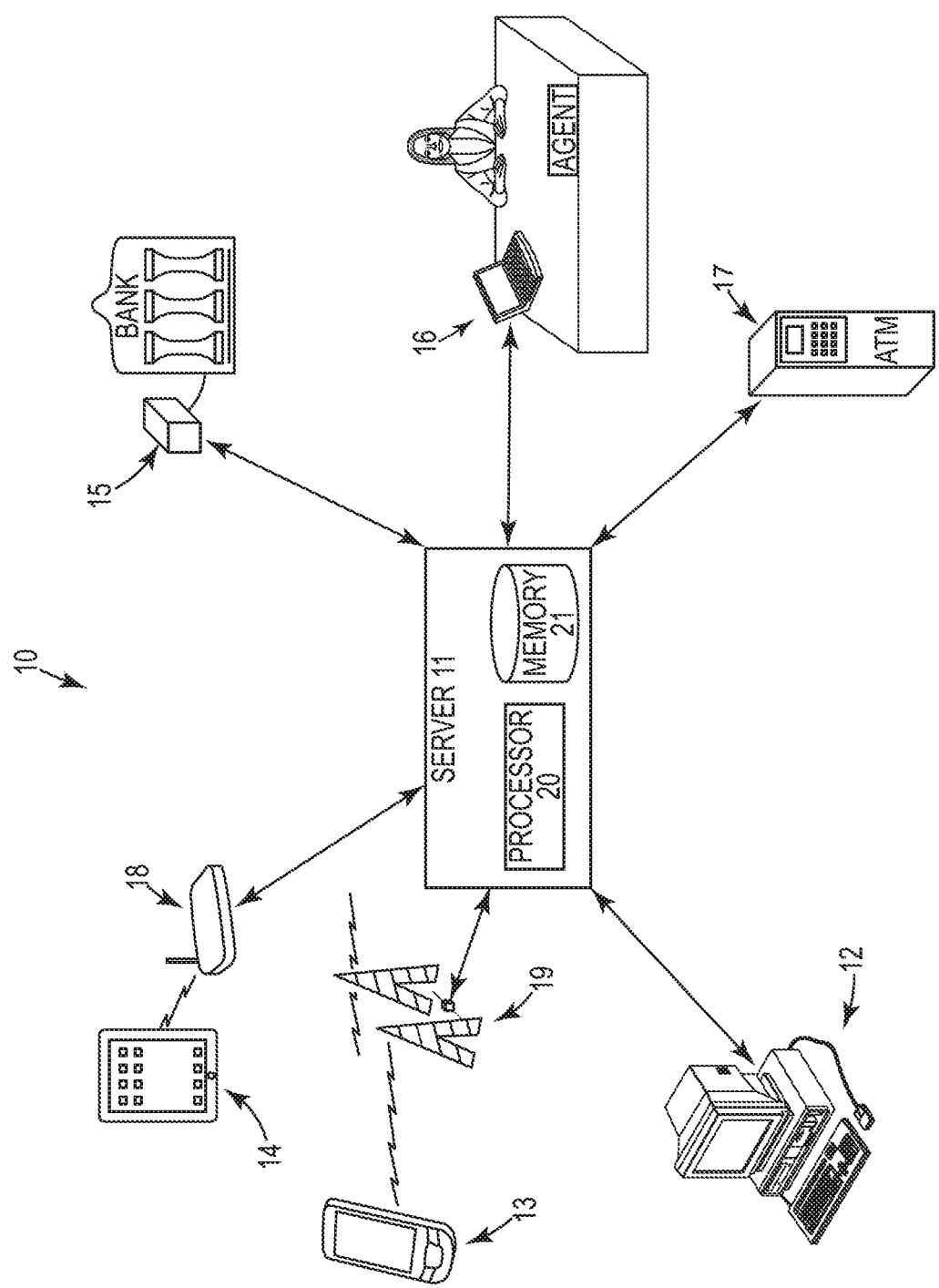
FIG. 1 is a block diagram of an embodiment of a system for facilitating money transfers.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Embodiments of the present disclosure concern creating user profiles and forming associations between user profiles over a computer network to facilitate money transfers. Some embodiments concern a computer network that stores profile information for a plurality of user profiles and associates various profiles with one another based on user selections. The associations between user profiles can be permanent, permanent in that they exist before, during, and after the duration of each transfer. Furthermore, information from the each of the sender's and receiver's profiles can be used to automatically set the terms of each transfer without manual selection or offline negotiation. Other features are further discussed herein.

FIG. 1 illustrates a computer network across which users can communicate and setup money transfers. As shown, the computer network can include a server 11 and a plurality of computing devices 12-17. The plurality of computing devices 12-17 can communicate with the server 11 through one or more computer protocols (e.g., TCP/IP) across one or more types of networks, such as cellular networks, local area networks, wide area networks, public networks, private networks, and other networks. Each of the plurality of computing devices 12-17 can be used by one or more users to communicate with the server 11. For example, a first user can use the interface of the personal computer 12 to communicate with the server 11. The personal computer 12 and/or any of other computing devices may include a browser or other application that provides a user interface for the user to communicate with the server 11. A second user can use the cellular telephone 13 (e.g., a multifunctional smart phone) to communicate with the server 11 via a cellular network 19. A third user can use the tablet computer 14 to communicate with the server 11 via a wireless router 18. The server 11 can communicate with a proprietary network 15 of a bank independent of the financial service provider that operates the server 11. A fourth user can interface with an agent of the bank to facilitate money transfers through the server 11.

An agent's computer 16 may be located at a facility that is approved by a financial services organization to facilitate money transfers. For example, the agent's computer 16 may be located at a store or dedicated location that provides redemption services for money transfers. The agent's computer 16 may be operated by an agent at the approved receive location. The agent's computer 16 can communicate with the server 11, and a fifth user can interface with the agent. A sixth user can use the automatic teller machine 17 (or similar type of automated banking interface) to communicate with the server 11. It will be understood that a variety of other computing devices can electronically communicate with the server 11 in accordance with the various embodiments of the present disclosure.

The server 11 communicates with the plurality of computing devices 12-17 by sending and receiving commands, requests, notifications, data, and the like over one or more communication networks. The server 11 operates a money transfer service with a user profile networking feature. A plurality of users interfacing with the plurality of computing devices 12-17 to communicate with the server 11 can create a plurality of respective profiles. The plurality of users can selectively associate their profiles to share information and setup transfers. The plurality of profiles can include profile information that can be used to automatically determine the terms of one or more money transfers between the users. The server 11 may also deduct any commissions or fees associated with the staged transfers from the funds provided by the senders. These and other aspects are further discussed herein.

The server 11 may be housed and/or operated by or on behalf of the financial services organization that, among other functions, approves and coordinates the staging of money transfers, communicates with the plurality of computing devices 12-17, and facilitates redemption by the receiver in the staged transfer (e.g., accepts money from the sender and in turn delivers money to the receiver). In some embodiments, the server 11 is configured to automatically process staged transfers from the sender. In other embodiments, the server 11 provides information to a user at the financial services organization for review and approval. For example, the server 11 may be connected to a computer that provides an interface to a user at the financial services organization to review and approve or deny communications associated with the staging of money transfers. In some embodiments, the server 11 provides compliance functions for the staged money transfers.

The server 11 can include one or more processors 20 and one or more data structures 21 (e.g., volatile/non-volatile memory, hard disk drives, etc.). The data structures 21 can be used to store any information referenced herein. It will be understood that server 11, or a server as otherwise referenced herein, can include a plurality of networked computing devices that manage a proprietary platform, and is not necessarily limited to a single computing device with a processor 20 and data structure 21 as represented herein for convenience.

FIG. 2 illustrates a profile setup page 30, which can be displayed on a user interface. The user interface can be part of any of the plurality of computing devices 12-17. The profile setup page 30 can be part of an application run on any of the plurality of computing devices 12-17 and/or the profile setup page 30 can be run on server 11 and represented on any of the plurality of computing devices 12-17 (e.g., as a webpage). The profile setup page 30 includes a plurality of fields for entering user information. The user information can be used to create a user profile. The user information can include various categories of information. As shown in FIG. 2, the profile setup page 30 includes fields for the entry of profile information 31 and the transfer of preference information 32. The profile information 31 can include identifying information such as name, address, picture, phone number, and/or email address, among other information useful for identifying and/or communicating with the user. The profile information 31 can further include marketing preferences, such as indications on whether and how the user would prefer to be contacted and offered deals by the provider of the money transfer service. The profile information 31 can include notification preferences indicating how (e.g., via text message, email, phone, etc.) the user prefers to be contacted and updated on money transfers by the provider of the money transfer service.

The transfer preference information 32 can include details on how the user would prefer to stage money transfers. For example, the transfer preference information 32 can include one or more preferred money send modes. The money send modes concern the method by which the sender can deliver money to the provider of the money transfer service. The different money send modes can include in-person transfer with an agent (e.g., at a retail or banking location), a remote transfer from an account (e.g., an inline transfer from a bank or checking account or a telephone call with an agent in which bank or credit card profile information is shared with the agent), or other mode of transferring money. In some cases, negative preferences can be specified, such as a prohibition on transfers to third parties on behalf of a receiver.

The transfer preference information 32 can further include a location of an in-person transfer with the agent. The transfer preference information 32 can further include minimum amounts for a money transfer and/or a limit on the amount of a money transfer. The transfer preference information 32 can include authorization for, or a prohibition of, recurring money transfers. The transfer preference information 32 can further include one or more preferred money receive modes. The money receive modes concern the method by which the receiver can receive money from the provider of the money transfer service. The different money receive modes can include in-person transfer with an agent (e.g., at a retail or banking location), a remote transfer to an account (e.g., an inline transfer to a bank account or a telephone call with an agent in which bank account information is shared with the agent), payment to a third party on the behalf of the receiver (e.g., to a company to which the receiver has an outstanding balance, i.e. a bill, or wishes to receive goods or services from the company), or other mode of transferring money. Multiple money send modes and multiple money receive modes can be identified by the user in the profile setup page 30. In some cases, the multiple modes will be ordered to indicate a first preference, a second preference as an alternative to the first preference, and possibly a third or more preferences. A preference order for multiple modes or other options can be useful for automatically setting the terms of a transfer where a first preference cannot be met, as further discussed herein.

The transfer preference information 32 can include a field for selecting which type of currency the user prefers to use when sending and/or receiving a money transfer. Multiple currency preferences can be entered, as well as a preference order as described previously. Other options for transfer preference information 32 can include default amounts of money to be sent and/or received, minimum and/or maximum amounts of money to be sent and/or received, a preferred agent location for in-person transfers, bank account information (e.g., bank account number and possible routing information) for one or more bank accounts, and/or credit card information for one or more credit card account.

It is noted that not all options for the transfer preference information 32 are shown on the profile setup page 30 or discussed herein, and other options are contemplated within the scope of this disclosure. In some cases, the transfer preference information 32 can allow a user to specify options that the user refuses to use, such that a transfer will not be staged in which the option is used. For example, a user can specify that the user refuses to send money to particular areas (e.g., one or more countries), refuses to transfer money to and/or accept money from particular entities (e.g., particular banks), refuses to use particular currencies, and/or any other option for specifying a refusal to agree to or otherwise refuse to participate with a particular term of a money transfer. It is further noted that a user may be able to not specify transfer preference information 32 for one or more of the preferences. For example, the user may not care which type of currency, delivery mode, and/or other term are used and may therefore leave corresponding fields blank or otherwise indicate a lack of a preference.

As each user of the plurality of users fills out the profile setup page 30 and sends the data to the server 11, the server 11 can create a profile for each respective user. As will be discussed further herein, the profile data can be stored on the server 11 and the profile information 31 and the transfer preference information 32 can be stored in association with the user profile. In this and other ways, a plurality of users can create a plurality of profiles, each of the profiles associated with profile information 31, transfer preference information 32, and/or other information.

FIG. 3 illustrates a profile search page 40 of a user interface. The profile search page 40 can be part of an application run on any of the plurality of computing devices 12-17 and/or the server 11, as discussed previously. The profile search page 40 can be used by the plurality of users to search the database of user profiles stored on the server 11 to identify profiles of acquaintances. The profile search page 40 can be used to initiate money transfers with another user. As shown, the profile search page 40 can include a search field 41 to enter search criteria such as a username, actual name, and/or other identifying information. The search criteria can be sent to the server 11 as a search query and the server 11 can identify one or more profiles that correspond to the search criteria. The identified one or more profiles can be sent from the server 11 to the respective computing device being used by the user who submitted the search query on the profile search page 40. The identified one or more profiles returned by the server 11 may be displayed as part of the original profile search page 40, as shown in FIG. 3, or maybe shown on a separate results page. In the example of FIG. 3, a list 42 of profiles corresponding to the search criteria entered in the search field 41 is displayed on the profile search page 40. The identified one or more profiles may only include basic identifying information (e.g., only a name), such that users cannot view all of the profile information 31 of the other users and further cannot view any of the transfer preference information 32 of the other users.

A user can use the cursor 43 on the profile search page 40 to select one or more of the identified one or more profiles returned by the server 11. Clicking on any one of the identified one or more profiles may bring up some additional information (e.g., general location data such as city) while still withholding some profile information 31 and some or all transfer preference information 32. The user can select one or more of the identified one or more profiles returned by the server 11 to establish an association between the user's profile and the profile of the selected profile and/or setup a money transfer. In some embodiments, an established association may be required for users to view additional information of each other's profiles (e.g., beyond the name of the user). In some embodiments, an established association may be required by the money transfer service, operating the server 11, to facilitate a transfer of money between users. In some embodiments, a first user may only need to select a second user's profile in-order to establish an association between the first user's profile and the second user's profile. However, it may be preferable to require the second user to confirm the first user's request in order to establish an association between the profiles. In some other embodiments, a selection of a second user's profile by a first user, and not necessarily an established association between the profiles of the first and second users, may be required to facilitate a money transfer between the first and second users.

The first user may already have a profile and can accordingly direct the server 11 to send an invitation to the second user (e.g., via email address, SMS, via a message on a separate social networking platform) with a link to create a profile. The second user's profile can automatically be associated with the profile of the first user because the first user directed the server 11 to send the invitation to the second user to create a profile.

Figure 4:
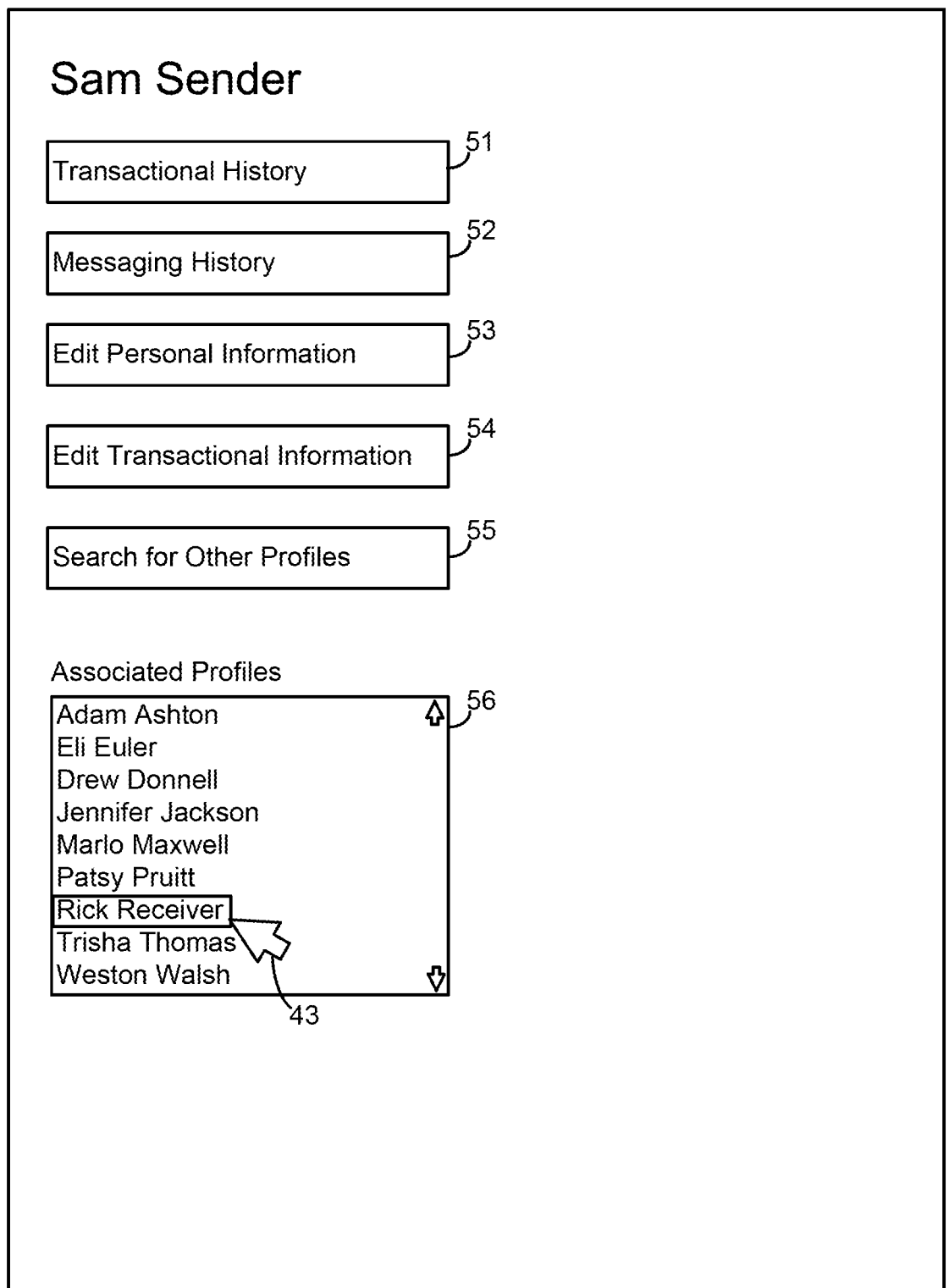
FIG. 4 is a view of a profile management page.

FIG. 4 illustrates a profile home page 50 of a user interface. The profile home page 50 can be part of an application run on any of the plurality of computing devices 12-17 and/or the server 11, as discussed previously. The profile home page 50 can be used by a user to view general status information concerning the user's profile. For example, the profile home page 50 can allow viewing of transfer history 51 (e.g., past and pending money transfers) and messaging history 52 (e.g., messages to and from other profile holders). The profile home page 50 can include fields to view and/or change profile information 53 and transfer preferences 54. A search field 55 can also be provided to begin a search for other profiles or open the profile search page 40.

The profile home page 50 further includes a list of profiles of associated profiles 56. Each of the profiles on the list of associated profiles 56 can correspond to a respective profile for which the user selected the respective profile to establish an association, as described herein, or for which the user received a request from another user (now on the list) to establish an association between the profiles. As such, non-associated profiles are not referenced in the list of profiles of associated profiles 56.

Figure 5:
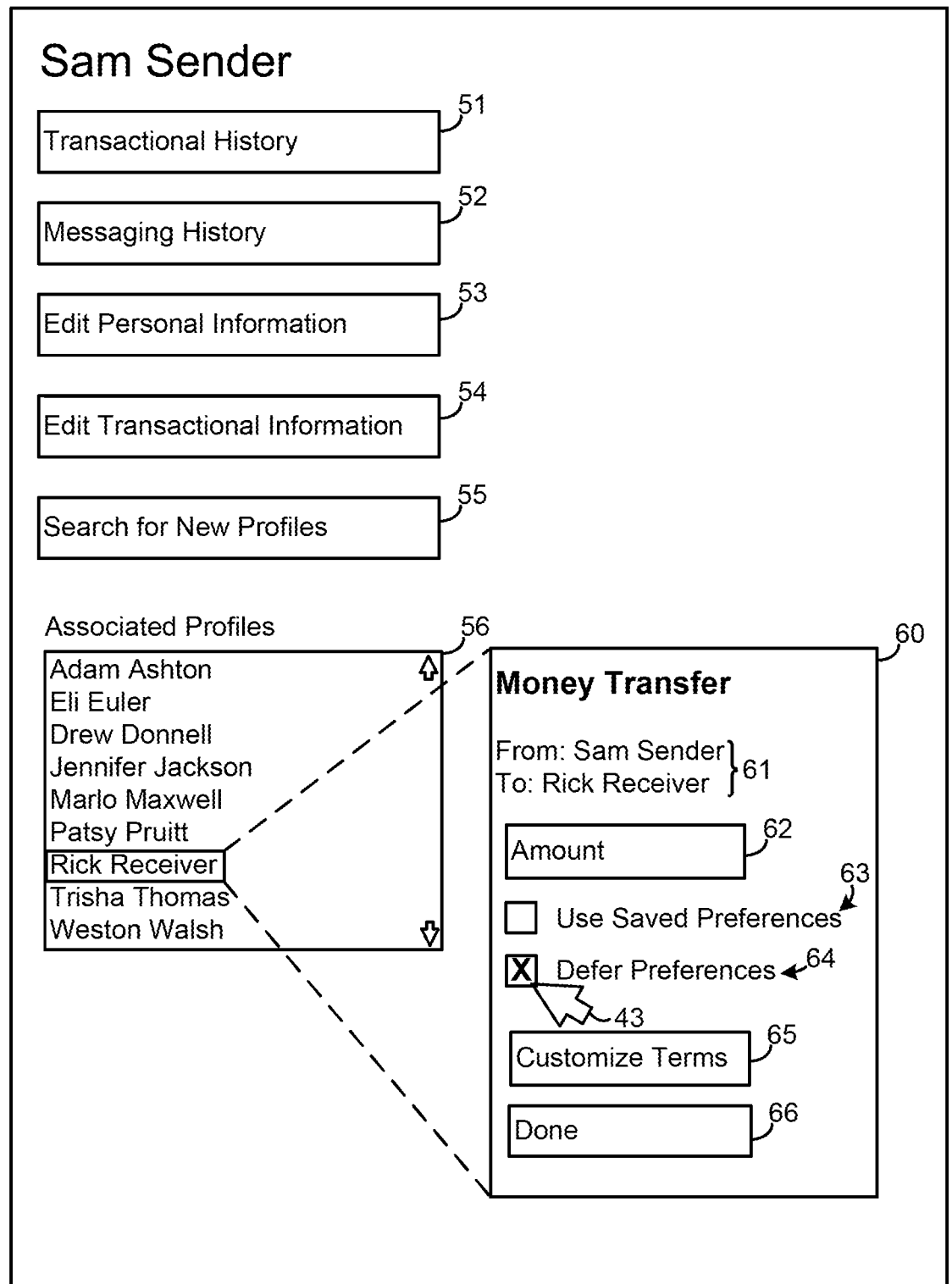
FIG. 5 is a view of a money transfer window.

The profile home page 50, and the list of associated profiles 56 in particular, can be used to initiate money transfers with a user of an associated profile. As shown in FIG. 4, the cursor 43 is used to select the associated profile of user Rick Receiver to initiate a money transfer. FIG. 5 illustrates the same profile home page 50 of FIG. 4, but in FIG. 5 a money transfer window 60 has been opened in response to the selection of Rick Receiver's profile. The money transfer window 60 can be used to view and manage terms of the money transfer. It is noted that in some embodiments the money transfer window 60 can alternatively be launched from the profile search page 40. The sender and receiver terms 61 of the transfer can be automatically set based on Sam Sender's selection of Rick Receiver's profile (e.g., the selection of another user's profile sets the selector as the sender and the selectee as the receiver). Other terms of the transfer can be automatically and/or manually set.

The value designation of the transfer can be manually entered or automatically set. In the case of manual entry, the user can enter the value designation into the amount field 62 to indicate the amount of money that the user intends to transfer. In the case of automatic setting of the value designation, the value designation can be set based on one or more previous transfers between the same or other users, or the value designation can be automatically set based on previously entered preference information 32. In the case of preference information 32, a user may have a previously saved preference indicating a particular amount of money to transfer as the default amount, such that the amount is automatically set as the transfer amount when a transfer is initiated. In some cases, different default preference amounts can be specified for each associated profile. For example, Sam Sender may have set the default transfer amount to Adam Ashton to be $50.00 and the default transfer amount to Rick Receiver to be $100.00. These amounts can be automatically set as terms of the transfer when Sam Sender initiates a money transfer to either Adam Ashton or Rick Receiver. The user may review and then change the value designation that was automatically set before completing the transfer request.

As shown in FIG. 5, the user may be given the option to use a set of saved preferences 63 or defer preferences 64. Selecting the option to use a saved set of preferences 63 causes the program to set one or more of the terms of the transfer based on the sender's previously indicated preference information 32. For example, if the sender selects the option to use the saved set of preferences 63, then some or all terms of the transfer can be set based on the sender's previously entered set of preferences. In many cases, the sender is the client of the money transfer service and the receiver is a third party beneficiary. As such, the provider of the money transfer service will honor the preferences of the sender over the preferences of the receiver. However, the sender may not be particular about the terms of the transfer and may be more concerned with the convenience of the transfer for the receiver. Therefore, the sender can select the defer preferences 64 option, which causes the program to use the receiver's set of preferences instead of the sender's set of preferences in setting the terms of the transfer. In some cases, a sender can defer all terms of the transfer to the receiver, some but not all terms of the transfers to the receiver, or only a single term to the receiver. The sender can select which of a plurality of different terms of the transfer to defer to the receiver. For example, the sender may specify that the transfer must be in a particular type of currency, but the sender may defer to the receiver one or more other terms such as whether the transferred money is routed to a bank account or made available for pick up with an agent. It is noted that separate fields are not provided to select/defer each term in FIG. 5, however one or more fields can be provided for selecting/deferring each term of the transfer as part of the money transfer window 60 or a separate page. Separate fields may be provided to specify and/or defer terms individually upon selection of the customize terms field 65.

The done field 66 can be selected (e.g., with the cursor 43) when the user is satisfied with the settings for the money transfer. Upon selecting the done field 66, the settings of the money transfer window 60 can be transmitted to the server 11 to stage the transfer.

Figure 6:
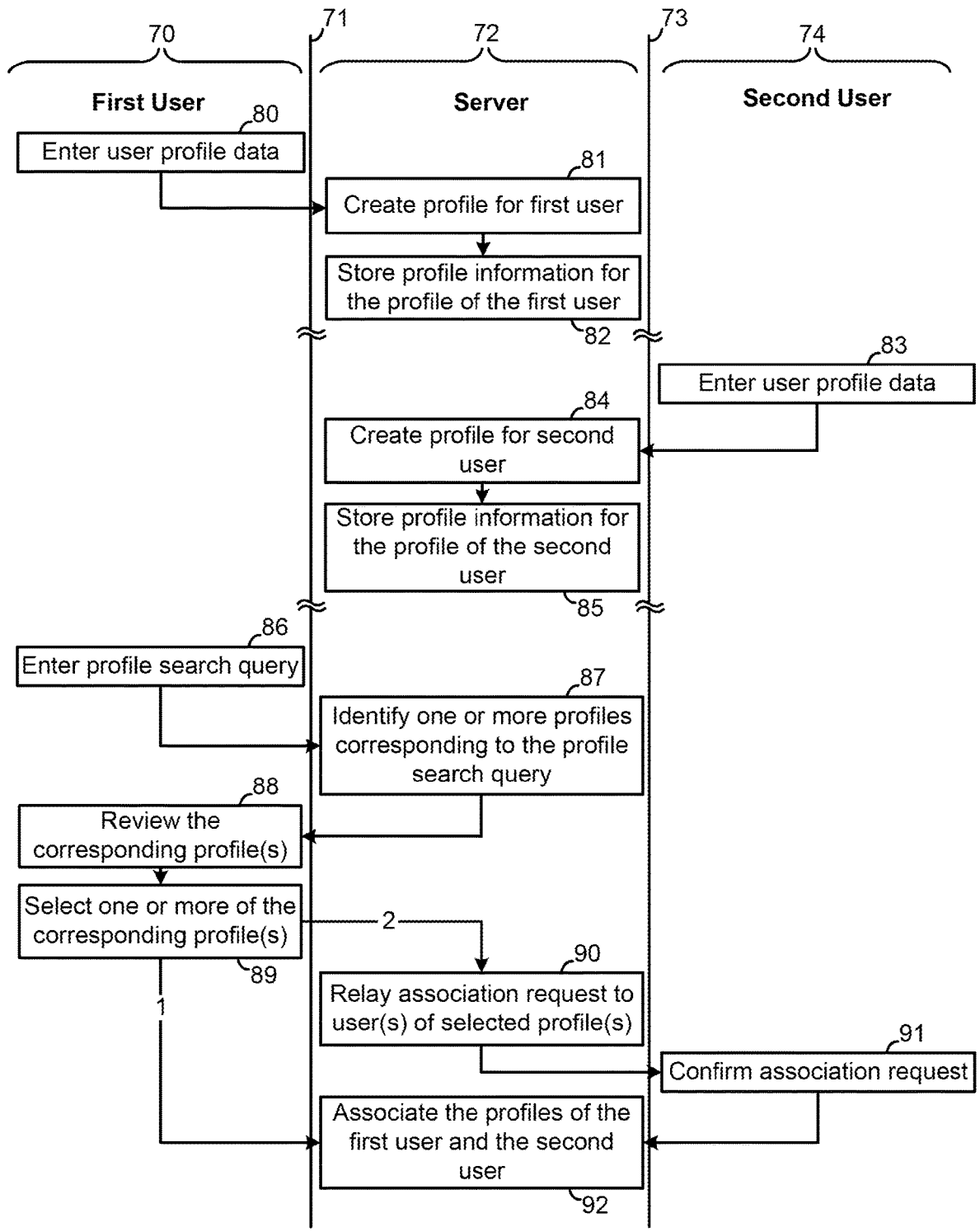
FIG. 6 is a flowchart of a method for setting up profiles.
Figure 7:
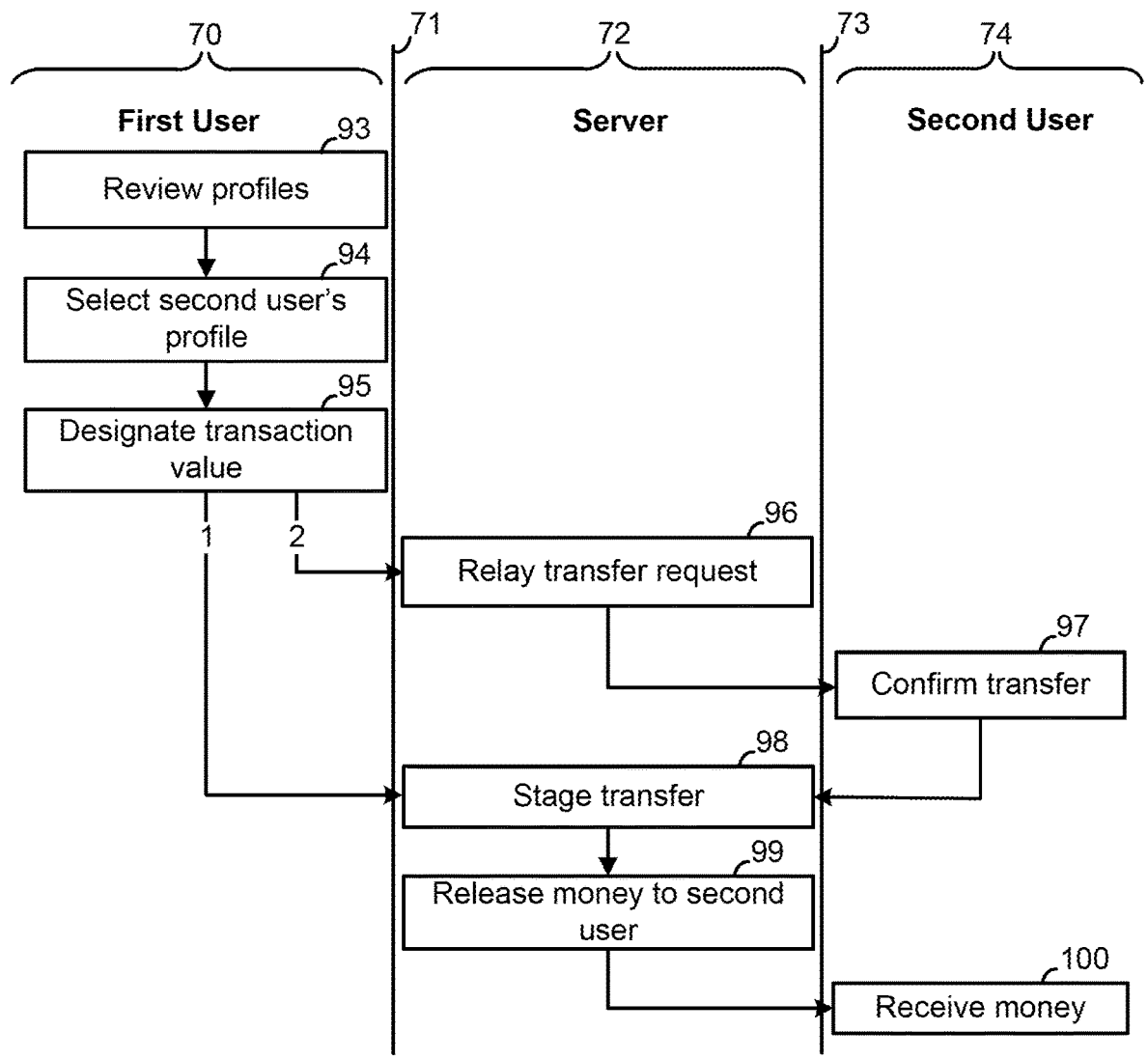
FIG. 7 is a flowchart of a method for facilitating money transfers between user having profiles.

FIGS. 6 and 7 illustrate flowcharts of communications sent between the server 11 and the computing devices of the first and second users. The computing devices can be any of the computing devices 12-17 of FIG. 1 or other devices. The server 11 can be the server of FIG. 1 or other networked computing platform. FIG. 6 generally concerns the creation of user profiles and then selectively associating user profiles with each other. FIG. 7 generally concerns staging a transfer between two users having profiles associated with each other.

The flowchart of FIG. 6 includes a first user column 70, a server column 72, and a second user column 74. The first user column 70 represents steps performed by a computing device being used by the first user. The server column 72 represents steps performed by the server. The second user column 74 represents steps performed by a computing device being used by the second user. It is noted that the steps within each of the columns can be performed by multiple computing devices. For example, the first user may use a first computing device for some of the steps and a second computing device for later steps. The columns are separated by a first divider 71 and a second divider 73. Each of the first divider 71 and the second divider 73 can represent transmission of information over one or more networks between the computing devices. For example, the first divider 71 can represent electronic communication between the computing device used by the first user and the server 11 while the second divider 73 can represent electronic communication between the computing device used by the second user and the server.

The flowchart of FIG. 6 includes entering 80 user profile data. The user profile data can be identifying information (e.g., profile information 31) and transfer preference information (e.g., preference information 32) referenced herein. The entered 80 user profile data can then be sent by the first user's computing device and received by the server. The server creates 81 a profile for the first user based on the entered 80 user profile data. A profile can include confidential access information (e.g., username and password) that limits access and execution of various functions to the first user. The server stores 82 the profile information for the first user's profile. Before, during, or after the entering 80, creating 81, and storing 82 steps, a second user can use the same process. For example, the second user enters 82 user profile data using a second computing device. The entered 82 user profile data is then sent by the second user's computing device and received by the server 11. The server 11 creates 84 a profile for the second user based on the entered 83 user profile data. The server 11 stores 85 the profile information for the second user's profile. It is noted that while profile creation is shown for first and second users, it will be understood that this or a similar process can be used to create any number of user profiles.

The flowchart of FIG. 6 further includes a process for forming associations between user profiles. Specifically, the flowchart shows several options for associating the profiles of the first user and the second user. The process of associating profiles can begin with the first user entering 86 a profile search query. In some cases, the profile search query can be an entry of data (e.g., as discussed in connection with the profile search page 40) that allows the first user to search through all of the profile information for all of the profiles saved on the server 11. The entered 86 profile search query can be sent to the server 11. After the server 11 receives the profile search query, the server 11 can identify 87 one or more profiles corresponding to the profile search query. The identification 87 of the one or more profiles can be performed by the server 11 searching the data of some or all of the profile information stored on the server 11 (e.g., the stored 82, 85 information). The entered 86 search query may be a partial or full name, and the server 11 can identify 87 all of the names that match and/or are similar to the partial or full name. In some cases, the entered 86 search query may be a username, which the second user may have previously told to the first user in anticipation of associating profiles.

The server 11 can send information (e.g., usernames and/or actual names) concerning the identified 87 one or more profiles to the computing device of the first user. After receiving the sent information concerning the identified 87 one or more profiles, the computing device can display the information. The information can comprise a list of usernames, actual names, and/or other information for the identified 87 one or more profiles. In some embodiments, some profile information for the identified 87 one or more profiles is still withheld, such as location information, contact information, and/or preferences. As discussed herein in connection with the profile search page 40, the first user can review 88 the information (e.g., a list of names) and select 89 one or more of the profiles. The selection 89 of the one or more profiles can be an affirmative step in requesting that an association be formed between the profile of the first user and the selected profile of the second user. Selecting 89 can comprise clicking on a name of the profile (e.g., username, actual name), highlighting the profile, or otherwise distinguishing the selected 89 profile from other identified 87 profiles.

In some embodiments, the selection 89 is sent to the server 11 and the server 11 associates the profiles of the first user and the second user, wherein the first user selected 89 the profile of the second user. In this embodiment, as shown by pathway 1 of the flowchart of FIG. 6, no input is needed from the second user to associate the profiles of the first and second users. However, as shown by pathway 2, the server 11 may relay 90 the association request to the second user by sending the association request to the computing device of the second user. After the computing device of the second user receives the association request, the second user can review the association request, which will indicate that the first user (e.g., identified by username, actual name, and/or other information) is requesting to associate his or her profile with the second user's profile. The second user can then provide an input on the computing device indicating a confirmation 91 or denial of the association request. The confirmation or denial can then be sent from the computing device to the server and possibly further to the computing device of the first user. The server 11 can refrain from associating 92 the first and the second profiles if the second user denies the association request. The server 11 can associate 92 the first and the second profiles if the second user approves the association request. Associating 92 the first and the second profiles can include one or more of allowing expanded viewing of profile and/or preference information of any associated profile relative to non-associated profiles, the ability to message any associated profile, and the ability to stage money transfers with any associated profile, whereby these functions may not be allowed by the server 11 without the profiles being associated. Although in some other embodiments, the server 11 may facilitate money transfers between users of unassociated profiles.

FIG. 7 illustrates a flowchart of a method of staging a transfer between first and second users having profiles. FIG. 7 can continue the interaction between the first user, the server 11, and the second user of FIG. 6. The method includes the first user reviewing 93 profiles. The review 93 of profiles can include looking at a list of usernames, actual names, and/or other distinguishing information for a plurality of profiles as described herein (e.g., as described in connection with FIG. 3). Each of the profiles can be created as described herein (e.g., as described in connection with FIGS. 2 and 6). Each of the reviewed 93 profiles may be associated with the first user's profile as described herein (e.g., as described in connection with FIGS. 3 and 6). In some cases, the review 93 can concern setting up a money transfer, and the review 93 may only be allowed of associated profiles. For example, the server 11 may allow the first user to review only associated profiles, as compared to unassociated profiles, for the purpose of launching a money transfer window 60 or otherwise initiating the setup of a money transfer setup to a particular user. The first user can select 94 the second user's profile from the plurality of reviewed 93 profiles, such as by clicking on the username, actual name, or some other indicator of the second user's profile. In some embodiments, the selection 94 of the second user's profile can bring up a transfer window or a different transfer page, both of which can have a field for designating 95 a transfer value (i.e. the amount of money that the first user intends to send to the second user in a transfer). Alternatively, the review 93 page can include a plurality of transfer value fields respectively associated with the reviewed profiles, and the selection 94 can be performed by entering the transfer value into the respective transfer value field for the second user's profile. Designating 95 the transfer value can include typing an amount into a transfer value field. In some cases, designating 95 the transfer value can include clicking or otherwise selecting one of a plurality of predetermined amounts, such as one of a list of five amounts between 10 and 1,000 dollars.

The selection 94 and the designation 95 can be sent from the computing device of the first user to the server 11. In some embodiments, the selection 94 and designation 95 are sent to the server 11 and the server stages 98 a transfer of the designated 95 transfer value from the first user to the second user. In such embodiments, as shown by pathway 1 of the flowchart of FIG. 7, no further input is needed from the first user or the second user to stage 98 the transfer because the profile information and preference information of the first user and/or the second user can be used by the server 11 to automatically set the terms of the transfer. However, as shown by pathway 2, the server 11 may relay 96 a transfer request to the second user by sending an indicator of the designated 95 amount and/or other term to the computing device of the second user. After the computing device of the second user receives the transfer request, the second user can review the transfer request, and then provide an input on the computing device indicating a confirmation 97 or denial of the transfer request. The confirmation or denial can then be sent from the computing device to the server 11 and possibly further to the computing device of the first user. The server 11 can refrain from staging 98 the transfer if the second user denies the association request, in which case the second user may be able to provide a message or other indication of a reason for the denial to allow the first user to reattempt the transfer. The server 11 can stage 98 the transfer if the second user approves the transfer request.

Staging the transfer 98 can include automatically setting the terms of the transfer and/or accepting payment from the first user (e.g., deducting the designated 95 amount from a bank account listed for the first user). With the transfer staged 98, the server 11 can release 99 the money (corresponding to the designated 95 amount) to the second user or be paid to a third party on behalf of the second user in accordance with the terms of the staged 98 transfer. For example, if the mode of delivery is to deposit the money in the bank account of the second user, then releasing 99 the money can include executing the deposit. If the mode of delivery is to pay the money to a third party, such as a company to which the second user has an outstanding balance or wishes to receive goods or services from the company, then releasing 99 the money can include transferring the money to the third party (e.g., to an account for the company). If the mode of delivery is to make the money available for pick up with an agent, then the money can be made available with the agent for pick up and/or the agent can be notified of the authorization for the second user to pick up the money. The second user 74 can then receive 100 the money in a bank account, at an agent location, or through another mode of delivery per the set terms of the transfer.

While the flowchart of FIG. 7 shows the first user, as a sender, initiating a money transfer, the same or similar method can be used wherein the receiver initiates the money transfer. In such embodiments, the second user, as a receiver, can select the profile of the first user, as a sender, and send a request to the server 11 and/or the computing device of the first user. The second user may designate an amount of the money transfer with the selection of the first user's profile or at a later time. In some embodiments, as discussed herein, a user may only be able to initiate a money transfer between users having associated profiles, and as such the first user's profile is presumed to already have been associated with the second user's profile to permit the second user to initiate the receiver initiated transfer. If the first user has already indicated a preference to not allow receiver initiated transfers, then the transfer request is denied by the server 11 and notification is sent to the second user. However, if the first user has provided a preference to allow receiver initiated transfers or has not provided an indication on point, then a request can be shown to the first user on an interface of the first computing device and the user can approve or deny the receiver initiated transfer. Alternatively, the first user may have entered preference information that automatically accepts receiver initiated transfers from the second user, in which case an affirmative approval step is not needed from the first user. If the first user inputs an approval or an approval is not needed, then the server 11 can set the terms of the transfer and stage the transfer as discussed herein. Such receiver initiated transfers can be applied to any of the other embodiments referenced herein.

In some cases, a first user, as a sender, may use the method of FIG. 7 or another other method herein to stage a money transfer with multiple receivers. For example, the selection 94 step can concern the selection of the profiles of a second user, a third user, and a fourth user (or any number of users). The same value can be designated 95 for each of the second, third, and fourth users, or different values can be designated 95 for each of the second, third, and fourth users. Money transfers can then be staged 98 to deliver money to each of the second, third, and fourth users. The respective transfer preferences of each of the second, third, and fourth users can be used by the server 11 in staging 98 the transfers such that different terms are used for the money transfers to the respective receivers. This example further demonstrates the efficiency that may be realized by the use of user profile information to automatically stage money transfers instead of requiring the sender to manually enter the information for each transfer. The method of FIG. 7 or other method referenced herein can additionally or alternatively be used to setup a reoccurring money transfer that comprises a plurality of transfers of money (e.g., to one or more receivers) to be performed at a plurality of different times according to a schedule.

Figure 8:
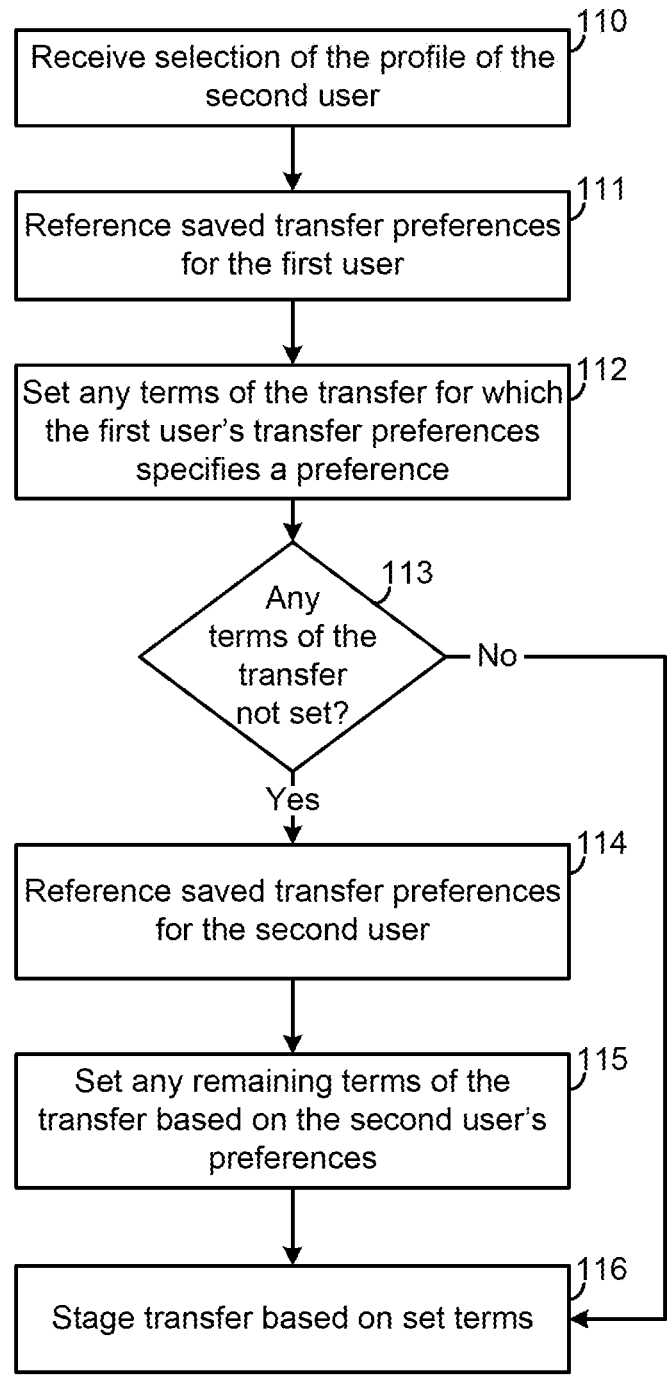
FIG. 8 is a flowchart of a method for setting terms of a money transfer based on profile preferences of user profiles.

FIG. 8 illustrates a flowchart of a method for staging a transfer. Specifically, the method concerns setting terms of the transfer based on the preferences of a sender and a receiver. In this example, a first user is a sender, a second user is a receiver, and the method presumes that, if necessary to allow the transfer, the profiles of the users have already been associated. The example can correspond to a variation of any staged transfers referenced herein, such as that of FIG. 7. Each of the steps of the method of FIG. 8 can be performed by the server 11. The method includes receiving 110 a selection of the second user. The selection can be received 110 from a computing device operated by the first user. The selection of the second user can be performed by the first user, and the selection can be made amongst a plurality of profiles associated with the profile of the first user. Based on the reception 110 of the selection, the server references 111 saved transfer preferences for the first user. The transfer preferences can be any of the transfer preferences referenced herein, such as any of the transfer preference information 32 of FIG. 2. Based on the saved transfer preferences, the server 11 can set 112 any terms for which the saved transfer preferences indicate a preference. It is noted that one or more saved preferences can be disclaimed by the first user when setting up a particular transfer (e.g., by making or not making a selection in the transfer window 60), such as by providing an indication to defer one or more preferences or terms to the sender.

Following the setting 112 of preferences based on the saved transfer preferences of the first user, the server 11 can then check 113 whether any terms of the transfer are not set. For example, the first user may not provide a preference for the mode of delivery of the money to the second user, type of currency, and/or other term. If all terms of the transfer are set 112, then the transfer can be staged 116. In this case, the transfer preferences of the second user are not used as the sender determines all the terms of the transfer. However, if one or more terms of the transfer are not set (e.g., no terms), as determined by check 113, then the server 11 references 114 saved transfer preferences for the second user and sets 115 any remaining (i.e. unset) terms of the transfer based on the second user's saved transfer preferences. The transfer is then staged 116 using the set 112, 115 terms. In case neither the first user nor the second user have saved preference information on which to set a particular term, then a query can be sent to either or both of the first user and the second user to specify the term.

It is noted that the server 11 can reconcile preferences between users such that the users do not need to negotiate the terms of the money transfer. Moreover, it is noted that the terms of the money transfer can be set without the first user being exposed to, or otherwise know of the preference information of the second user and/or the one or more set 112, 115 terms. Likewise, the second user may not be exposed to, or otherwise know of, the preference information of the first user and/or the one or more set 112, 115 terms. For example, the server 11 may be configured to withhold some of the sender's information from the receiver and/or withhold some of the receiver's information from the sender. The server 11 may be configured to withhold some of the sender's money transfer preferences from the receiver and/or withhold some of the receiver's money transfer preferences from the sender. The server 11 may be configured to withhold one, several, or all of the set 112, 115 terms of the money transfer from either of the sender or the receiver. For example, the server 11 may not provide an indication to the sender concerning the set mode of delivery of the money to the receiver, the currency, or other term. As such, some or all of the profile and/or preference information of the users can remain confidential while allowing a money transfer to be facilitated.

A method similar to that of FIG. 8 can be used to set terms of a transfer when the first user has a saved preference specifying how a term is not to be set while not specifying how to set the particular term. For example, the preference information of the first user may specify that an in-person pick-up of the transferred money, a transfer to a third party (e.g., to pay a bill), a particular currency, and/or other mode are not to be used (referred to herein as a negative preference because they indicate what is not to be allowed) while not specifying a delivery mode, currency, or other mode to be used instead (referred to herein as a positive preference because they prescribe how one or more parties are to operate). Because an affirmative preference is not specified, the server 11 can automatically set the term based on the second user's preference. If the second user's preference conflicts with the first user's negative preference, then a secondary preference of the second user can be used. For example, the transfer preference information 32 for the second user can include a preference order concerning a single term (e.g., delivery mode, currency, or other term), wherein a first preference is used when the first preference does not conflict with a negative preference of the first user and a second preference is used when the first preference does conflict with a negative preference of the first user. It is noted that multiple modes and options are shown in the transfer preference information 32 of FIG. 2. If the second user does not provide a preference that does not conflict with a negative preference of the first user, then a query can be sent to either or both of the first user and the second user to specify the term.

It will be understood that while a first user and a second user have been used as examples to demonstrate various aspects of this disclosure, these same functions can be used repeatedly to create profiles, associate profiles, and stage money transfers between any number of profiles (e.g., for a third user, a fourth user, a fifth user, etc.). It is further noted that the money transfers referenced herein can relate to a money transfer, facilitated by a money transfer service, from a sender (e.g., as a first user) to a receiver (e.g., as a second user) without a bilateral exchange of value between, or on behalf of, the sender and the receiver. As such, the transfer from the sender to the receiver can be a unilateral exchange of money from the sender to the receiver without an exchange of goods, services, or other thing of value in return to the sender.

The techniques described in this disclosure, including those of FIGS. 1-8 and those attributed to a system, computing device, server, processor, and/or other type of control circuitry, or various constituent components, may be implemented wholly or at least in part, in hardware, software, firmware or any combination thereof. The functions referenced herein and those functions of FIGS. 1-8, may be embodied as firmware, hardware, software or any combination thereof as part of control circuitry specifically configured (e.g., with programming) to carry out those functions, such as in means for performing the functions referenced herein. The steps described herein may be performed by a single processing component or multiple processing components, the latter of which may be distributed amongst different coordinating devices. In this way, a server may be distributed between multiple devices. Depiction of different features is intended to highlight different functional aspects and does not necessarily imply that such features must be realized in separate embodiments or separate elements. Rather, functionality associated with one or more elements may be performed by separate hardware or software components, or integrated within common or separate hardware or software components of the system as control circuitry.

When implemented in software, the functionality ascribed to a system, devices, and/or a server described in this disclosure may be embodied as instructions on a physically embodied computer-readable medium such as RAM, ROM, NVRAM, EEPROM, FLASH memory, magnetic data storage media, optical data storage media, or the like, the medium being physically embodied in that it is not a carrier wave, as part of control circuitry. The instructions may be executed by a processing component to support one or more aspects of the functionality described in this disclosure.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

We claim:

1. A non-transitory computer-readable medium having a computer program stored thereon for facilitating a money transfer involving a first user and a second user, the computer program comprising instructions for causing one or more processors to:
   provide a money transfer application on a first user interface of a first computing device associated with the first user, the first user being associated with a first user profile, wherein the first user profile comprises one or more first money transfer preferences;
   receive a selection of a second user profile via the first user interface, the second user profile being associated with the second user, wherein the second user profile includes one or more second money transfer preferences, and wherein the second user profile was created in response to the first computing device directing a server to send a link to a second computing device associated with the second user;
   receive a value designation via the first user interface; and
   stage a money transfer between the first user and the second user based on the one or more first money transfer preferences, the one or more second money transfer preferences, or both.

2. The non-transitory computer-readable medium of claim 1, the computer program comprising instructions for causing one or more processors to create an associated between the first user profile and the second user profile.

3. The non-transitory computer-readable medium of claim 2, wherein the association between the first user profile and the second user profile is a permanent association.

4. The non-transitory computer-readable medium of claim 1, wherein the one or more first money transfer preferences, the one or more second money transfer preferences, or both comprise at least one selected from the group of: a preferred money send mode, a preferred money receive mode, a minimum amount for a money transfer, a limit on the amount of a money transfer, and a currency preference.

5. The non-transitory computer-readable medium of claim 4, wherein the preferred money send mode, the preferred money receive mode, or both comprise multiple modes.

6. The non-transitory computer-readable medium of claim 5, wherein the multiple modes are ranked in order of preference.

7. The non-transitory computer-readable medium of claim 1, the computer program comprising instructions for causing one or more processors to:
   receive one or more first money transfer preferences from the first user via the user interface; and
   creating a first profile for the first user based on the one or more first money transfer preferences.

8. A computing device for facilitating a money transfer involving a first user and a second user, the computer device comprising a processing device configured to:
   provide a money transfer application on a user interface of the computing device associated with the second user, the second user being associated with a second user profile, wherein the second user profile comprises one or more second money transfer preferences, and wherein the second user profile was created in response to another computing device directing a server to send a link to the computing device;
   provide a notification via the money transfer application on the user interface a first user profile associated with the first user has initiated a money transfer, the money transfer comprising a value designation, wherein the first user profile comprises one or more first money transfer preferences;
   receive a confirmation via the user interface to accept the money transfer; and
   stage a money transfer between the first user and the second user based on the one or more first money transfer preferences, the one or more second money transfer preferences, or both.

9. The computing device of claim 8, wherein the processing device is further configured to create an associated between the first user profile and the second user profile.

10. The computing device of claim 9, wherein the association between the first user profile and the second user profile is a permanent association.

11. The computing device of claim 8, wherein the one or more first money transfer preferences, the one or more second money transfer preferences, or both comprise at least one selected from the group of: a preferred money send mode, a preferred money receive mode, a minimum amount for a money transfer, a limit on the amount of a money transfer, and a currency preference.

12. The computing device of claim 11, wherein the preferred money send mode, the preferred money receive mode, or both comprise multiple modes.

13. The computing device of claim 12, wherein the multiple modes are ranked in order of preference.

14. The computing device of claim 13, wherein the processing device is further configured to:
receive one or more first money transfer preferences from the first user via the user interface; and
creating a first profile for the first user based on the one or more first money transfer preferences.

15. A computing device for facilitating a money transfer involving a first user and a second user, the computer device comprising a processing device configured to:
provide a money transfer application on a user interface of the computing device associated with the second user;
receive a link from a server to create a profile, wherein the link is sent in response to a first computing device associated with the first user directing the server to send the link;
receive one or more money transfer preferences via the user interface; and
create a profile for the second user based on the one or more money transfer preferences, wherein money transfers for the second user are based on the one or more money transfer preferences.

16. The computing device of claim 15, the processing device being further configured to: create an association between the profile and another user profile.

17. The computing device of claim 16, wherein the association between the first user profile and the second user profile is a permanent association.

18. The computing device of claim 15, wherein the one or more money transfer preferences comprise at least one selected from the group of: a preferred money send mode, a preferred money receive mode, a minimum amount for a money transfer, a limit on the amount of a money transfer, and a currency preference.

19. The computing device of claim 18, wherein the preferred money send mode, the preferred money receive mode, or both comprise multiple modes.

20. The computing device of claim 12, wherein the multiple modes are ranked in order of preference.

* * * * *